(12) United States Patent
Niewczas et al.

(10) Patent No.: US 12,476,852 B2
(45) Date of Patent: Nov. 18, 2025

(54) PHASOR-BASED SIGNAL DETECTOR

(71) Applicant: Qorvo US, Inc., Greensboro, NC (US)

(72) Inventors: Jaroslaw Niewczas, Jozefow (PL); Michael McLaughlin, Dublin (IE); Ciaran McElroy, Dublin (IE)

(73) Assignee: Qorvo US, Inc., Greensboro, NC (US)

( * ) Notice: Subject to any disclaimer, the term of this patent is extended or adjusted under 35 U.S.C. 154(b) by 97 days.

(21) Appl. No.: 18/566,994

(22) PCT Filed: Jun. 10, 2022

(86) PCT No.: PCT/US2022/033094
§ 371 (c)(1),
(2) Date: Dec. 4, 2023

(87) PCT Pub. No.: WO2022/261493
PCT Pub. Date: Dec. 15, 2022

(65) Prior Publication Data
US 2024/0372761 A1    Nov. 7, 2024

Related U.S. Application Data

(60) Provisional application No. 63/209,692, filed on Jun. 11, 2021.

(51) Int. Cl.
*H04L 27/00* (2006.01)

(52) U.S. Cl.
CPC .. *H04L 27/0014* (2013.01); *H04L 2027/0026* (2013.01); *H04L 2027/0067* (2013.01)

(58) Field of Classification Search
CPC ............. H04L 27/2675; H04L 27/2657; H04L 27/0014; H04L 27/2613; H04L 5/0048;

(Continued)

(56) References Cited

U.S. PATENT DOCUMENTS 9,001,933 B2    4/2015   Oh et al.
10,700,901 B1*  6/2020   Torrini ............... H04L 27/0014
(Continued)

FOREIGN PATENT DOCUMENTS

EP         1964346 B1    10/2011

OTHER PUBLICATIONS

International Search Report and Written Opinion for International Patent Application No. PCT/US2022/033094, mailed Sep. 28, 2022, 14 pages.

*Primary Examiner* — Eva Y Puente
(74) *Attorney, Agent, or Firm* — Withrow & Terranova, P.L.L.C.

(57) ABSTRACT

A phasor-based signal detector includes a signal processor to detect symbols in a received signal in the presence of an offset between the carrier frequency and an oscillator frequency of the signal processor. The signal processor calculates a phasor that indicates a phase difference between a first sample in a first symbol group and a second sample in a second symbol group. The first and second samples each include a real part and an imaginary part corresponding to a same sample position within the first and second symbol groups. Calculating the phasor includes a complex multiplication of one of the samples and a conjugate of the other one of the samples. A phase difference indicated by a phasor meeting a criteria may be used to estimate a carrier frequency offset (CFO). If the CFO is within a supported range, the signal processor may coherently accumulate symbols.

24 Claims, 11 Drawing Sheets

(58) Field of Classification Search
CPC .............. H04L 27/2662; H04L 5/0007; H04L 25/0224; H04L 2027/0026; H04L 2027/0067; H04L 1/205; H04B 5/263; H04B 5/79; H04B 1/71632; H04B 1/71635; H04B 1/71637; H04B 1/7176; H04B 1/719; H04B 1/0475; H04B 1/12; H04W 72/23; H04W 72/0446; H04W 72/20; H04W 72/0453; H04W 48/12; H04W 4/70; H04W 74/0808; H04W 72/232
See application file for complete search history.

(56) References Cited

U.S. PATENT DOCUMENTS

| | | | |
|---|---|---|---|
| 2004/0190655 A1 | 9/2004 | Chung et al. | |
| 2009/0041161 A1* | 2/2009 | Jian | H04L 27/2662 370/208 |
| 2009/0111411 A1* | 4/2009 | Koivunen | H04L 27/0014 455/226.1 |
| 2010/0062705 A1* | 3/2010 | Rajkotia | H04L 5/006 455/1 |
| 2014/0023164 A1* | 1/2014 | Oh | H04L 27/14 375/334 |
| 2014/0169488 A1* | 6/2014 | Varanese | H04L 27/2613 375/295 |
| 2022/0158870 A1* | 5/2022 | Hewavithana | H04L 25/0256 |

\* cited by examiner

PHASOR-BASED SIGNAL DETECTOR

RELATED APPLICATIONS

This application is a 35 USC 371 national phase filing of International Application No. PCT/US2022/033094, filed Jun. 10, 2022, which claims the benefit of provisional patent application Ser. No. 63/209,692, filed Jun. 11, 2021, the disclosures of which are incorporated herein by reference in their entireties.

FIELD OF THE DISCLOSURE

The technology of the disclosure relates generally to wireless communication and, more particularly, to detecting a signal where a carrier frequency offset (CFO) is unknown.

BACKGROUND

Wireless communication has become ubiquitous with electronic devices, machinery, and vehicles. Wireless communication technologies may include cellular (e.g., 5G), WiFi, Bluetooth, Infrared, Ultra-Wide Bandwidth (UWB), etc. At the physical level (PHY), when a transceiver or communication with the transceiver is first activated, a receiving device begins listening for recognizable signals. The ability of a receiver to recognize a signal depends on the signal-to-noise ratio (SNR), which can be affected by many factors, including power limitations of a particular wireless technology, the distance between transmitters and receivers, and environmental conditions, among other factors. Additionally, there may be differences between a signal generated by a transmitter and a signal expected by a receiver. For example, even though a particular communication technology operates at a predefined frequency, the frequencies of operation of a transmitter and a receiver may both deviate above or below the predefined frequency. Consequently, it can be difficult for the receiver to recognize the received signal. This difference between the frequency of a transmitted signal and a frequency of operation of a receiver is known as carrier frequency offset or carrier clock frequency offset (CFO). The frequency of an oscillator in a transmitter or receiver may be stabilized by a phase-locked-loop (PLL), but variations in circuit manufacturing processes, as well as environmental conditions, can cause frequency variations even when a PLL is employed. The frequencies of a transmitter and a receiver may also differ due to the Doppler Effect when a distance between a transmitter and a receiver changes. As a result, a receiver may have difficulty detecting an incoming signal. Various approaches have been used to address this problem, but such approaches can be costly in terms of circuit complexity, power consumption, and/or signal detection latency.

SUMMARY

A phasor-based signal detector is provided. Related methods of signal processing are also disclosed. A wireless device receives data that is encoded into symbols transmitted in a radio-frequency signal based on a carrier frequency. A phasor-based signal detector includes an exemplary signal processor employing a signal processing method to detect symbols in a received signal having a carrier frequency offset from a frequency of an oscillator of the signal processor. The signal processor calculates a phasor that indicates a phase difference between a first sample in a first symbol group and a second sample in a second symbol group of symbols in the received signal. The first sample and the second sample each include a real part and an imaginary part corresponding to a same sample position of the symbols in the first and second symbol group. Calculating the phasor includes a complex multiplication of one of the samples and a conjugate of the other one of the samples. In some examples, a phase of a phasor that satisfies a criteria may be used to estimate the carrier frequency offset (CFO). In some instances, if the estimated CFO is within a maximum supported range, the signal processor may coherently accumulate symbols.

An exemplary embodiment provides a signal processing method that comprises calculating a first sample based on energy of a first symbol group comprising at least one symbol and calculating a second sample based on energy of a second symbol group comprising at least one symbol. The method further comprises calculating a first conjugate of one of the first sample and the second sample and calculating a first phasor based on a complex multiplication of the first conjugate and the other one of the first sample and the second sample. In the claimed method, the first sample corresponds to a first sample position of each symbol of the first symbol group; and the second sample corresponds to the first sample position of each symbol of the second symbol group.

Another exemplary embodiment provides a signal processor method, configured to calculate a first sample based on energy of a first symbol group comprising at least one symbol and calculate a second sample based on energy of a second symbol group comprising at least one symbol. The signal processor is further configured to calculate a first conjugate of one of the first sample and the second sample and calculate a first phasor based on a complex multiplication of the first conjugate and the other one of the first sample and the second sample. In a signal processor, the first sample corresponds to a first sample position of each symbol of the first symbol group; and the second sample corresponds to the first sample position of each symbol of the second symbol group.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 4:
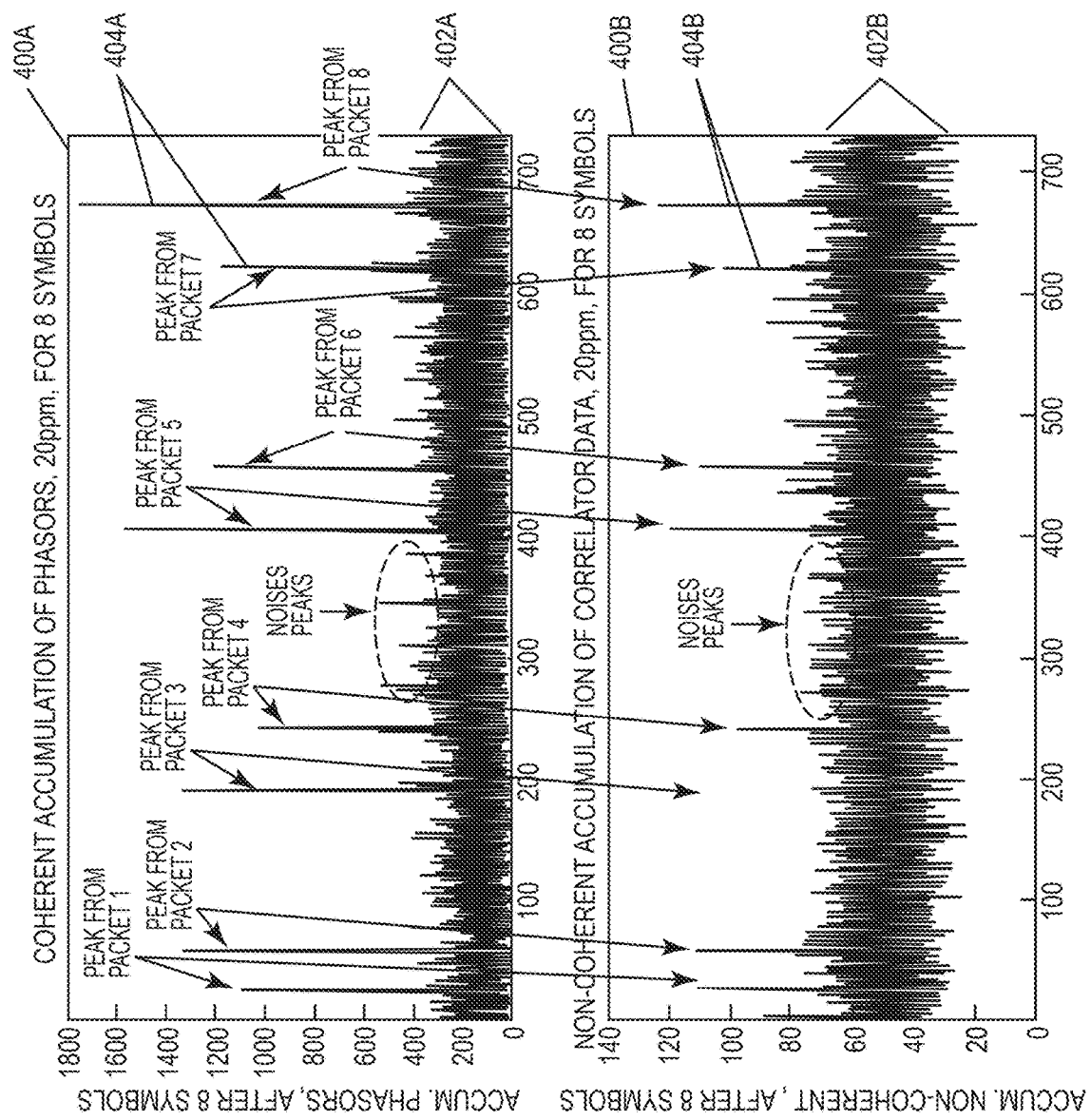
Figure 5:
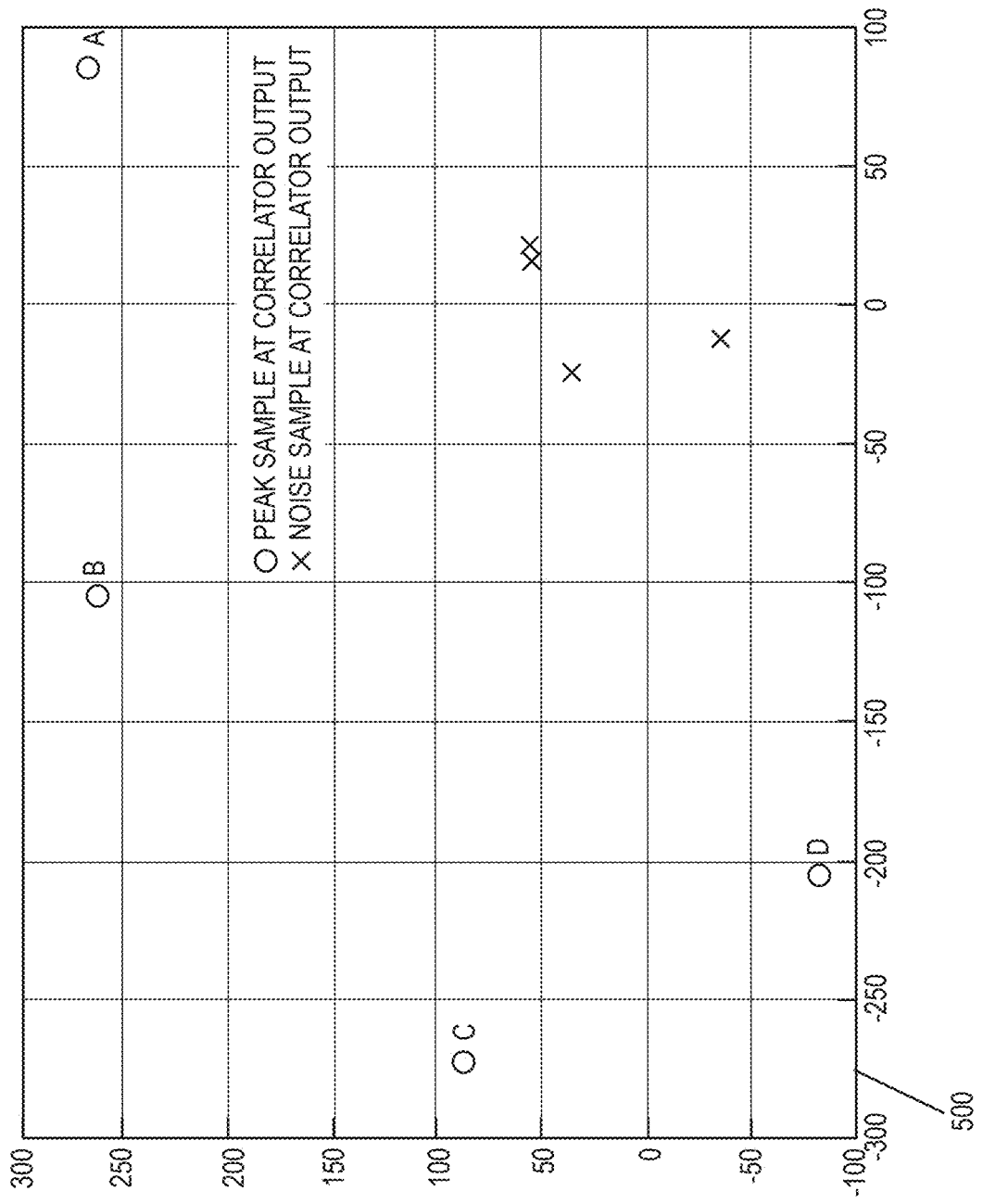
Figure 6:
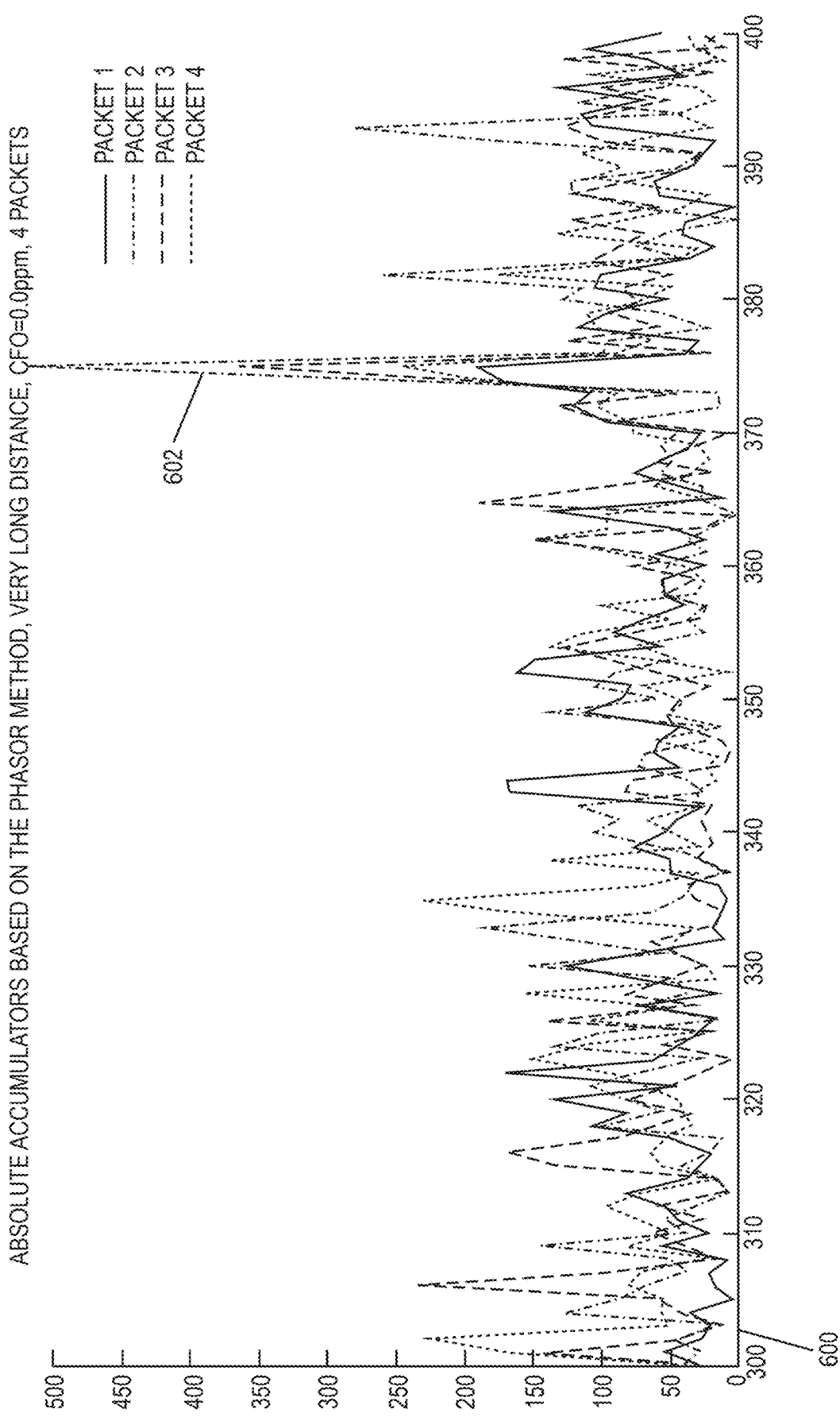
Figure 7:
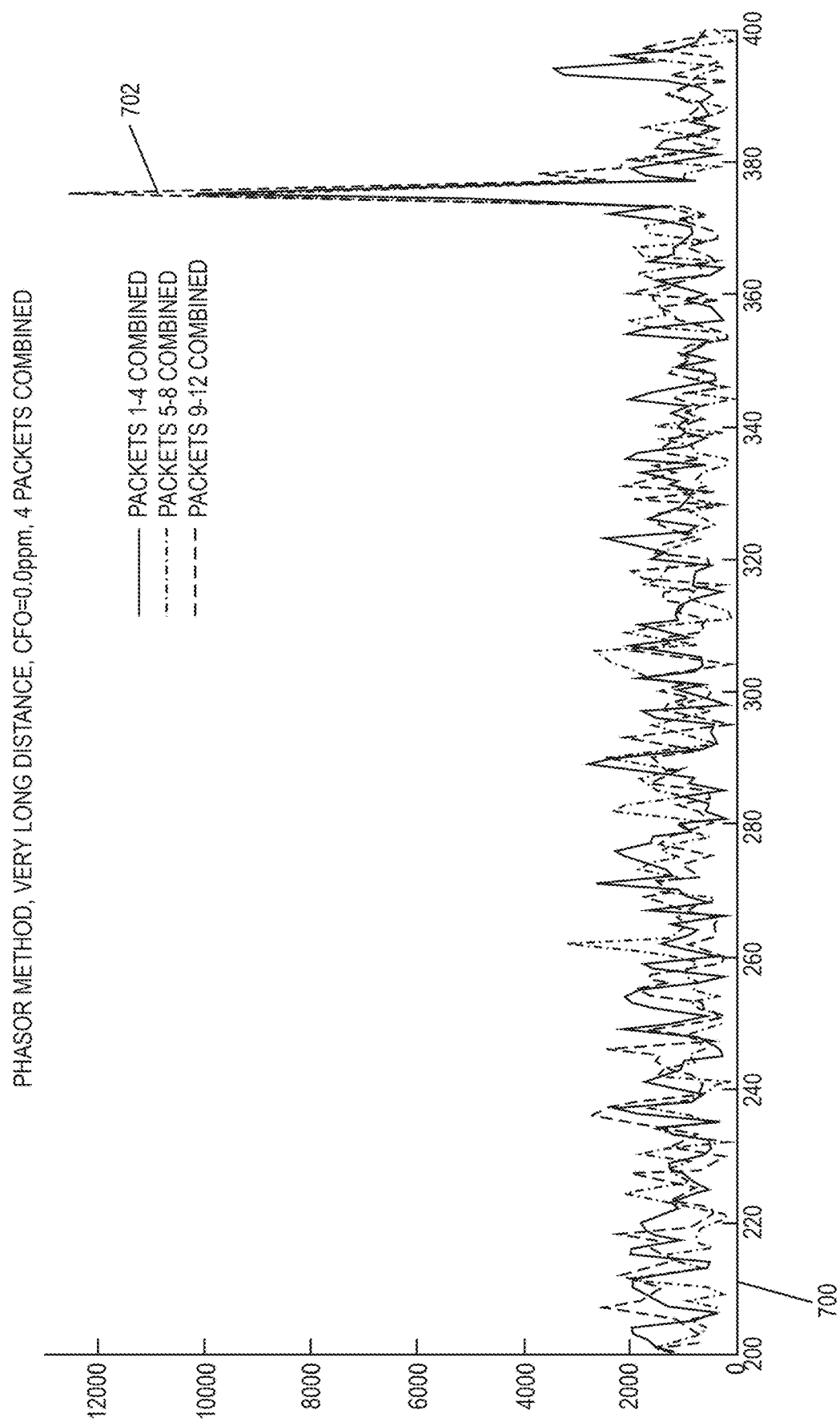
Figure 8:
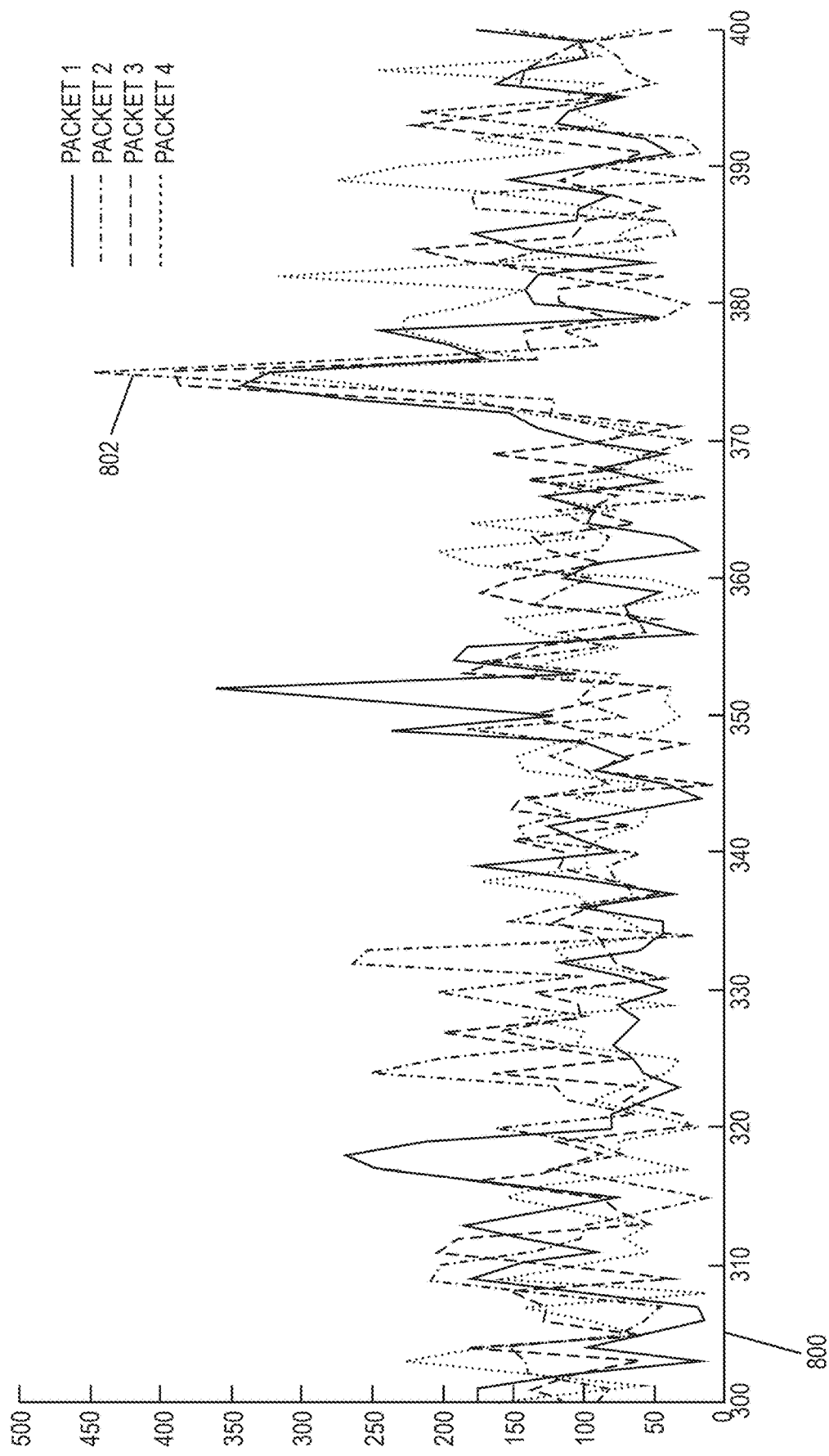
Figure 9:
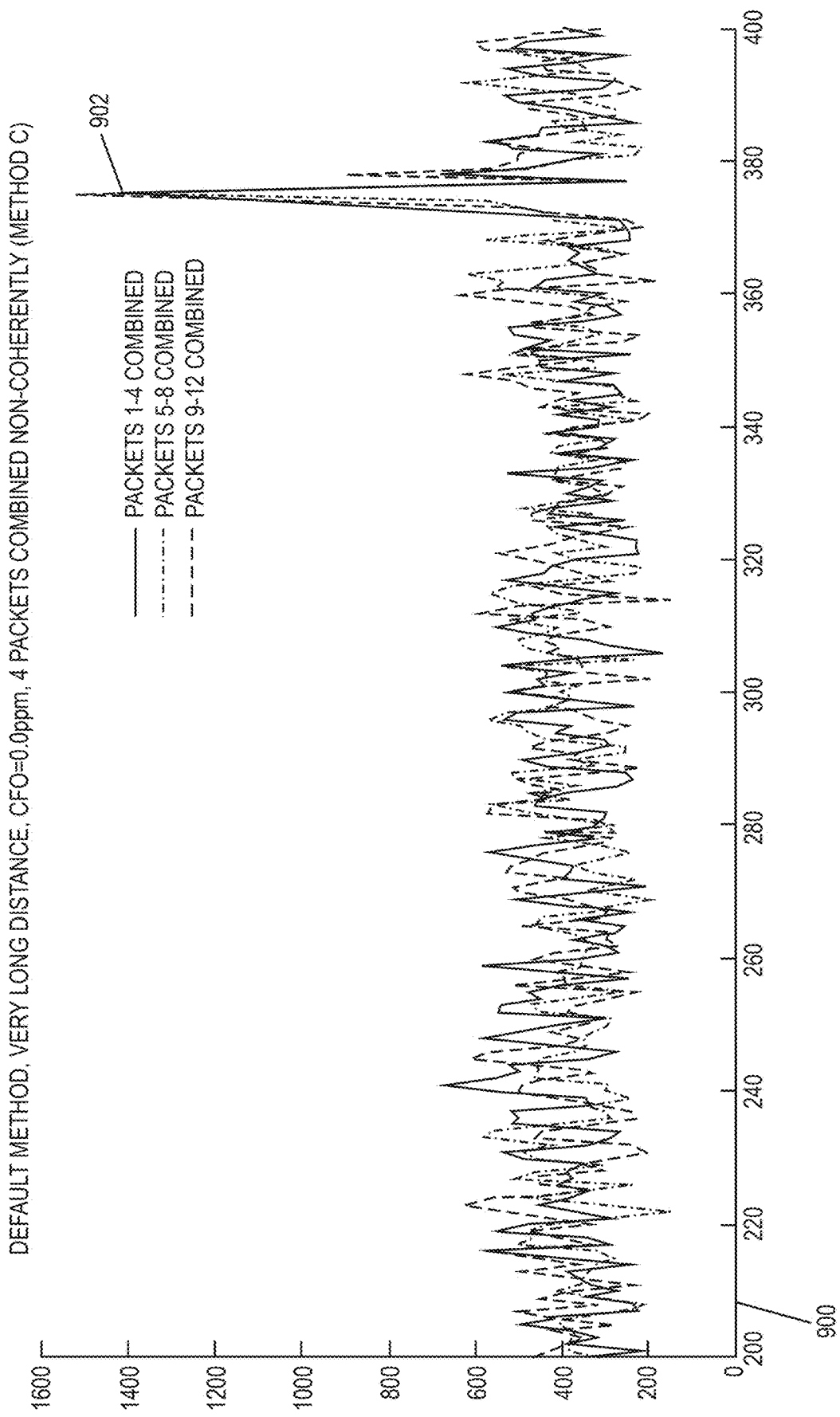
Figure 10:
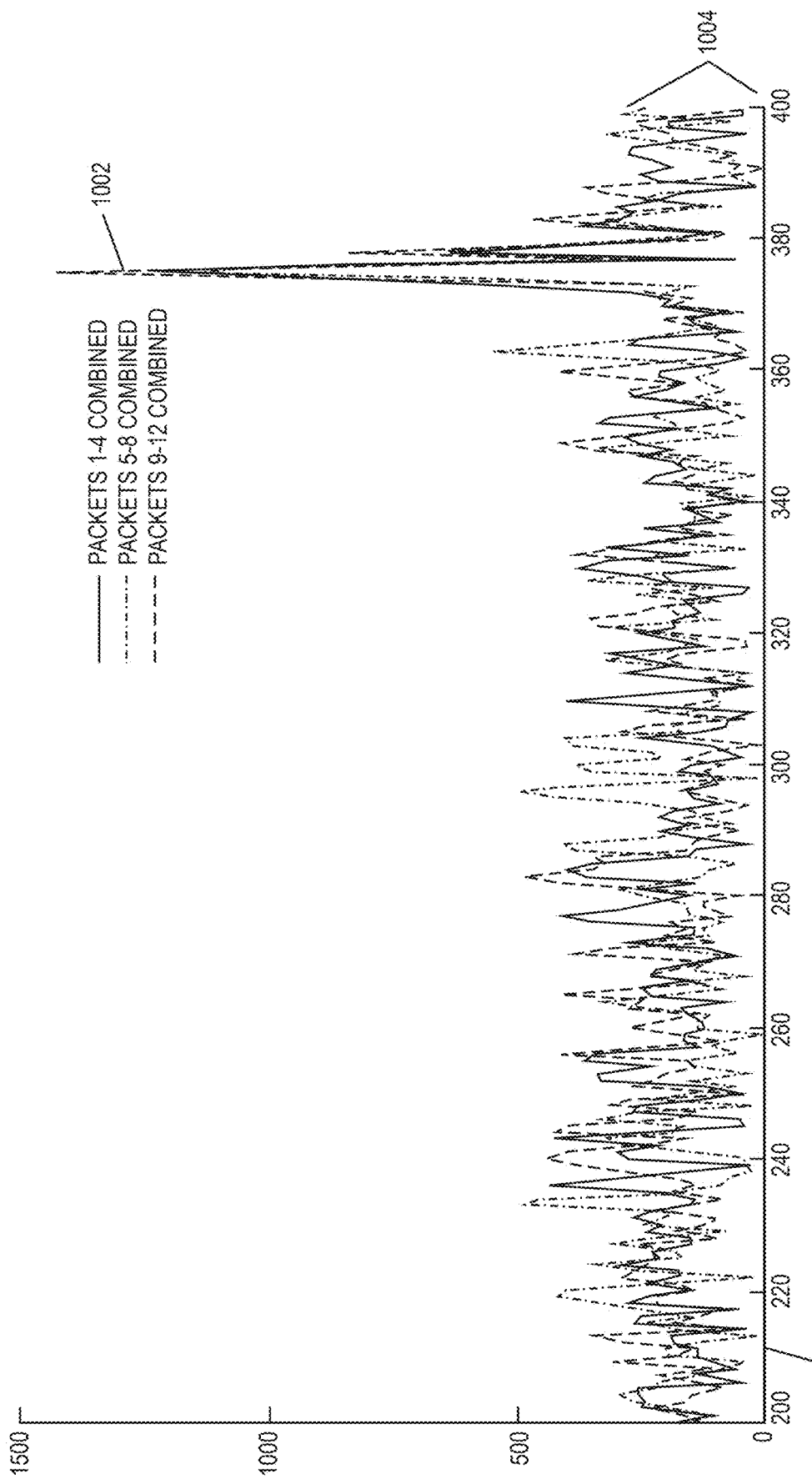
Figure 11:
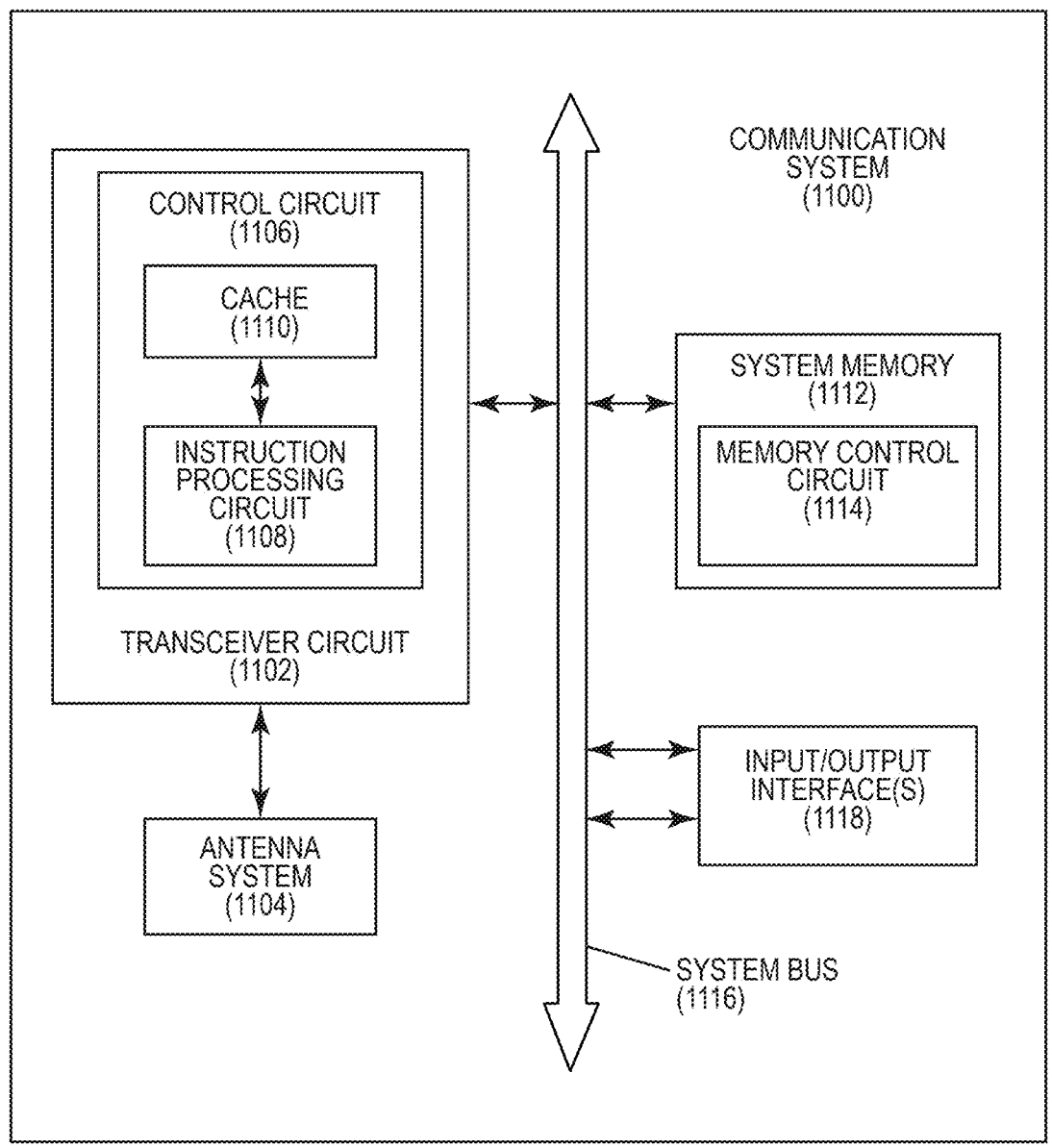

FIG. 4 includes graphs showing a comparison of non-coherent vs. coherent (phasor-based) preamble accumulation;

FIG. 5 is a plot of samples indicating signal peaks a phase change between consecutive symbols of a signal;

FIG. 6 is a graph showing examples of single packet accumulators, which may not be sufficient to differentiate a weak signal from noise in the phasor-based method;

FIG. 7 is a graph showing accumulators combined coherently in a phasor-based method;

FIG. 8 is a graph showing single packet accumulators in the standard method;

FIG. 9 is a graph showing accumulators combined non-coherently (the default method);

FIG. 10 is a graph showing accumulators combined coherently (the default method, with phasor-based combining); and FIG. 11 is a diagram of a communications system, including a transceiver circuit including a signal processor according to the methods disclosed herein.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A phasor-based signal detector is provided. Related methods of signal processing are also disclosed. A wireless device receives data that is encoded into symbols transmitted in a radio-frequency signal based on a carrier frequency. A phasor-based signal detector includes an exemplary signal processor employing a signal processing method to detect symbols in a received signal having a carrier frequency offset from a frequency of an oscillator of the signal processor. The signal processor calculates a phasor that indicates a phase difference between a first sample in a first symbol group and a second sample in a second symbol group of symbols in the received signal. The first sample and the second sample each include a real part and an imaginary part corresponding to a same sample position of the symbols in the first and second symbol group. Calculating the phasor includes a complex multiplication of one of the samples and a conjugate of the other one of the samples. In some examples, a phase of a phasor that satisfies criteria may be used to estimate the carrier frequency offset (CFO). In some instances, if the estimated CFO is within a maximum supported range, the signal processor may coherently accumulate symbols.

When a receiver in a wireless device or transceiver is initially powered on or activated or has returned from being out of range of a transmitted signal, for example, a receiver may use several approaches to initially detect a signal. The main problem is that the CFO, which is the clock frequency offset between the signal and the receiver, is initially unknown. Although a transmitter and a receiver both include oscillators that are intended to have a same clock frequency, the frequencies of both oscillators may be different than the intended frequency and may also vary, which causes the CFO and causes changes to the CFO. The Doppler effect can also cause CFO.

Once the CFO is known, coherent accumulation can be used to accumulate the signal in-phase such that noise averages out. When the CFO is unknown, a common approach to detecting the incoming symbols initially would be to use a non-coherent detector, where only the absolute value of the signal is used. However, non-coherent accumulation has much poorer sensitivity than coherent accumulation due to the accumulation of symbols at random phase differences. Sensitivity of a non-coherent detector can be increased only by approximately 1 dB with each doubling of the accumulation period, whereas a fully coherent detector would gain 3 dBs of sensitivity with each doubling. Therefore, to gain an extra 3 dB sensitivity, the non-coherent detector would need to average four times as many symbols as a coherent detector, which would require very long sequences.

In addition, when the non-coherent detector detects the signal, the CFO is unknown because all phase information is removed when the absolute value of the signal is calculated. Attempting to improve upon the non-coherent detector, one may try to detect the signal by accumulating samples in the coherent way. However, this approach would only work when the CFO is known. Due to the CFO, it is generally not possible to coherently accumulate, in the complex domain, the symbol energy of symbols in the received signal because the phase of the incoming signal changes constantly at an unknown rate. With an unknown CFO, only a few symbols could be coherently accumulated before the phase would have changed (e.g., rotated) to such an extent that further accumulation would start canceling the already accumulated energy. Cancellation of the accumulated energy will occur if the phase difference of the signal at the time of a second accumulated symbol has changed, relative to a first accumulated symbol, by more than 90-degrees.

UWB-Specific Introduction

An exemplary apparatus and method disclosed herein include calculating a phasor indicating a phase difference between samples of symbol groups in a received signal. The disclosed method is described below with reference to ultra-wideband (UWB) communication as an example. However, the methods and signal processor configured to perform such methods, as described herein, could apply to any other wireless communication technology employing methods of signal detection independent of the packet, field, symbol, and sequence format examples below. The incoming detected signal can include repetitive sequences of symbols and/or arbitrary non-repetitive symbols.

Figure 1:
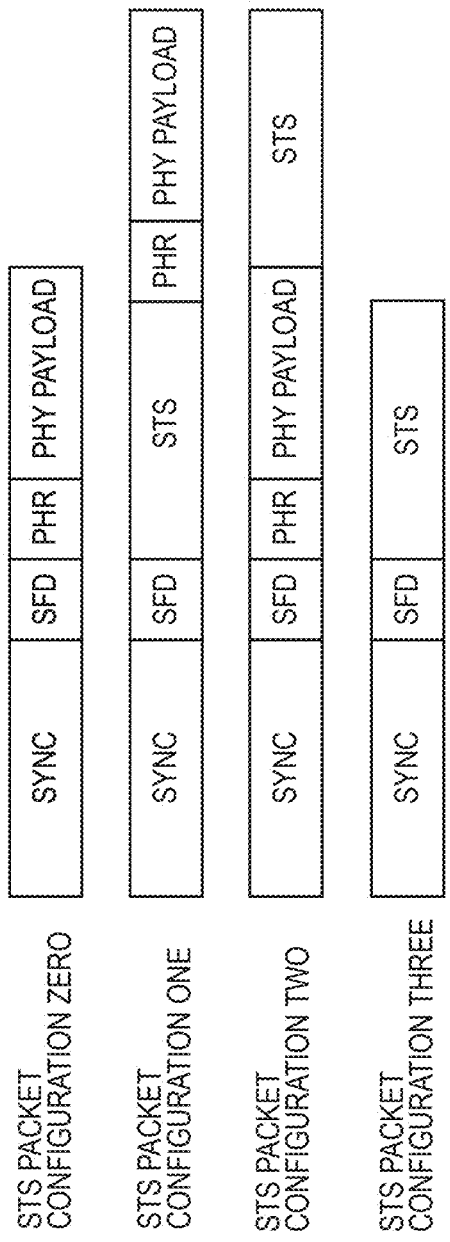
FIG. 1 is a diagram showing HRP (high-rate pulse repetition), physical level (PHY), UWB (ultra-wideband) packet types (802.15.4z)

The new UWB IEEE standard (802.15.4z) defines several packet types within the HRP UWB PHY, illustrated as STS packet configuration zero, STS packet configuration one, STS packet configuration two, and STS packet configuration three, respectively, as shown in FIG. 1. Each packet type comprises several fields, with the first one typically being the SYNC sequence (preamble) used for synchronization. The SYNC sequence is followed by SFD, which ends the synchronization, and then a PHY Payload (preceded immediately by the data header called PHR), a secure timestamp sequence (STS), or a combination of both.

Each field in a packet includes symbols in which information may be encoded. As known in the art, each symbol may comprise data encoded in a sequence of pulses (not shown) at respective positions within the symbol, where each pulse may have a value of +1, 0, or −1, for example. However, this is just one non-limiting example of encoding a symbol that may be detected according to the present disclosure. In UWB, the SYNC field may include a symbol that is repeated several times to give a receiver more opportunities to detect the symbol and synchronize to the incoming packet.

One of the most critical receiver parameters is the sensitivity limit, which determines a maximum distance at which the receiver is able to receive the packet correctly. The sensitivity limit may alternatively be determined by a maximum attenuation that occurs in the case of closer but non-line-of-sight transmissions. A typical maximum range of CFOs that a UWB receiver must tolerate is +/−40 ppm. At 40 ppm, phase rotation may be, for example, 70 to 135 degrees per 1 μs symbol, depending on the center frequency and the symbol length. Therefore, for the receiver to coherently accumulate four (4) symbols in the signal-detection process, the CFO would need to be +/−10 ppm to avoid energy cancellation in the accumulator.

In the exemplary method disclosed herein, the signal can be detected quickly and coherently with good sensitivity, within a wide range of supported CFO levels, and without multiple parallel processing blocks, as explained further below. Additionally, the disclosed method can be employed to estimate the CFO accurately. In some examples, to shorten convergence time, the estimated CFO can be used to initialize a carrier recovery algorithm and timing recover algorithms, which may also be referred to as carrier and timing tracking algorithms. A shorter acquisition sequence allows more of the energy budget to be used for other parts of the frame, which is particularly beneficial in the case of UWB because UWB packets have a very tight total energy budget. A shorter acquisition sequence also saves transmitter and receiver power consumption since the packets can be shorter.

Preamble/Sync Detection

In an 802.15.4a/4z UWB receiver, one of the receiver stages typically involves a correlator. Since the preamble signal consists of a SYNC symbol having a known sequence, the correlator is programmed with the known sequence of pulses of the SYNC symbols. The symbol length depends on a mode (e.g., HPRF or BPRF) of operation. When the preamble is being received, the correlator may sample the received symbol at each position and compare it to the known sequence of pulses. The known sequence may match the received symbol when aligned at a particular position. However, since that alignment position within the symbol is unknown to the correlator, the correlation peak (at which a match occurs) may appear in any sample. In addition, when the correlation peak occurs, it may be so weak compared to the noise level that it could take accumulation of several symbols before the correlation peak clearly stands out. Although the method disclosed above is directed to signal detection using a correlator, the methods disclosed herein may also be applicable to systems that do not employ a correlator.

Even though the CFO is unknown, the rotation rate or rate of change of phase between the received signal and the receiver oscillator is nearly constant. In this regard, the signal's phase will consistently change by the same angle from one symbol, or one symbol group, to the next. Thus, in an exemplary aspect, the signal processor (e.g., a signal processing circuit) can determine the CFO based on the phase change from a first sample at a first sample position to another sample at a same sample position and further based on the clock frequency and the symbol length.

As an example, the signal processor can determine a phase difference between two consecutive symbols from a phasor, which is calculated as:

```
for N=>symbol_groups
    for S=>samples_per_symbol      % accumulate phasors
        phasor(S) = phasor(S) + symbol_data(N−1,S) *
            complex conjugate(symbol_data(N,S));
    end
end
```

The above calculation may also be described as:

$$\text{phasor}(S) = \text{phasor}(S) + \text{symbol\_data}(N-1, S) * \overline{\text{symbol\_data}(N, S)}$$

where $\overline{\text{symbol\_data}(N,)}$ is a complex conjugate of symbol_data($N$, $S$).

As used herein, a complex number ($Z=a+bi$) includes a real portion "a" and an imaginary portion "bi". A "complex conjugate" ($Z_{cc}$) of Z is defined as $Z_{cc}=a-bi$.

In the above equations, the phasor is calculated by complex multiplication of a sample of a previous symbol_data (N−1) at a sample position S and a conjugate of a sample of the current symbol_data (N) at the sample position S. Alternatively, the phasor may be calculated from a conjugate of a sample of the previous symbol_data (N−1) at the sample position S, and a sample of the current symbol_data (N) at the sample position S. The sample S of the previous symbol_data (N−1) corresponds to a same position within a symbol as the sample S of the current symbol_data (N).

As indicated above, determining the change in phase between consecutive samples due to the CFO includes calculating a phasor based on a complex multiplication of a sample of a first symbol group and a conjugate of a sample of a second symbol group. A conjugate of one of a first sample and a second sample is calculated and multiplied by the other one of the first sample and the second sample. The first symbol group may precede or follow the second symbol group. Stated differently, the phasor may be calculated based on a complex multiplication of a sample of a second symbol group and a conjugate of a sample of a first symbol group.

A first sample and a second sample are calculated based on energy of a first symbol group and a second symbol group, respectively. A sample includes a real portion and an imaginary portion. A sample may correspond to a sample position of each symbol of a symbol group, which may comprise one or more symbols. Thus, the sample may correspond to an average of samples taken at a same sample position of a plurality of symbols. The sample may alternatively correspond to another measure (i.e., other than an average) based on samples taken at a same sample position of a plurality of symbols. One or more of the symbols in a first symbol group may also be in the second symbol group. A symbol group may include consecutive or non-consecutive symbols, for example, or any other selection of symbols. In the above equations, the symbol_data (N−1,S) and the symbol_data (N,S) represent samples taken in a same position S in a first symbol group having an index N−1 and the first sample position S of a second symbol group having an index N. In this example, the first symbol and the second symbol are indexed consecutively (as "N" and "N−1"), but they may be separated by any number of symbols, as desired.

Figure 2:
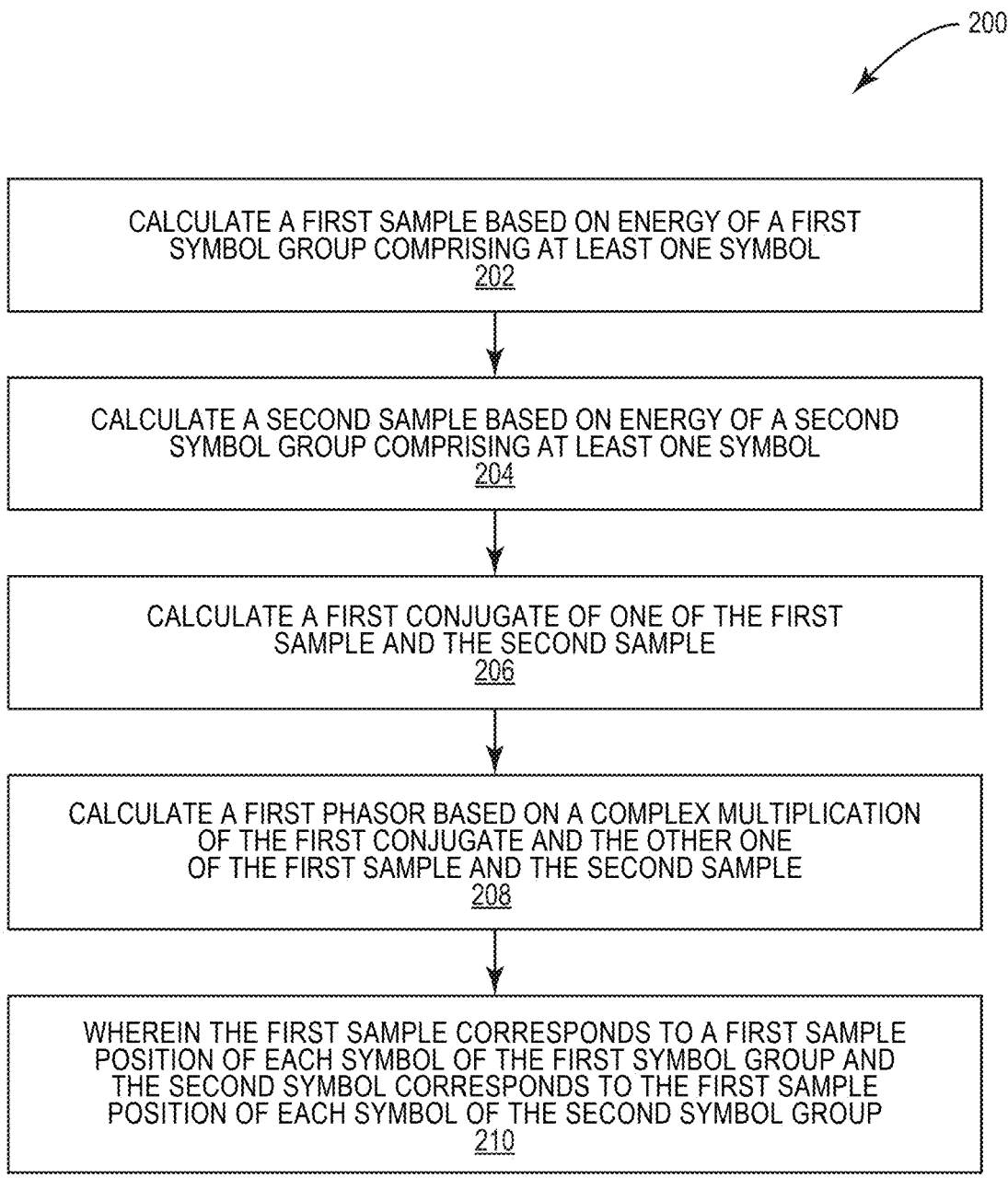
FIG. 2 is a flow chart of an exemplary signal processing method for calculating a first phasor.

The signal processing method 200 for calculating a phasor is illustrated in FIG. 2. The method includes calculating a first sample based on energy of a first symbol group comprising at least one symbol (block 202). The method includes calculating a second sample based on energy of a second symbol group comprising at least one symbol (block 204). The method further includes calculating a first conjugate of one of the first sample and the second sample (block 206) and calculating a first phasor based on a complex multiplication of the first conjugate and the other one of the first sample and the second sample (block 208). In the method 200, the first sample corresponds to a first sample position of each symbol of the first symbol group, and the second symbol corresponds to the first sample position of each symbol of the second sample group (block 210).

Since the phasors will have the same phase between samples of the symbols groups (of one or more symbols), assuming they are computed for the actual preamble peak being received at the same position, the phasors may be accumulated or filtered coherently over time. Accumulation of the phasors may include filtering a first phasor and a second phasor in the accumulator.

A phasor indicates more than just a phase difference. A phasor's amplitude also depends on the strength of current and previous symbols, so it is also an indication of the strength of a path. Coherent accumulation, which may include filtering, of such phasors will lead to rapid growth of a peak in an accumulator corresponding to a position where the actual peak is located. Random noise will accumulate more evenly in the other positions.

Figure 3:
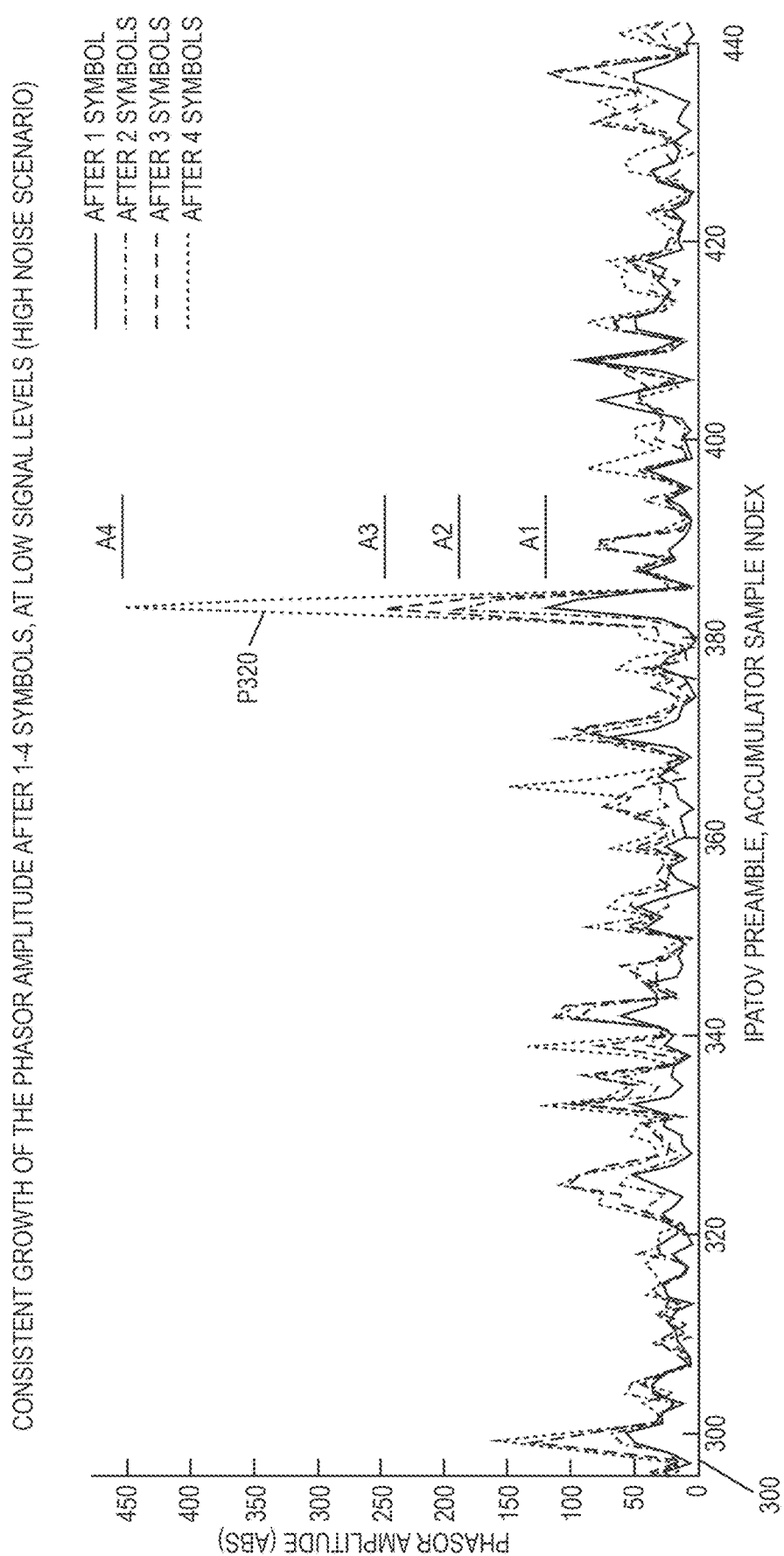
FIG. 3 illustrates an increase in amplitude of an accumulation of phasors (e.g., phasor-based accumulator) as a plurality of symbols (or symbol groups) are accumulated.

FIG. 3 is a graphical representation 300 showing consistent growth of a phasor 302 during preamble detection as described above. As shown in FIG. 3, the amplitude A1 of the true peak $P_{320}$ after just one symbol may or may not stand out enough from the noise to reliably indicate that the preamble is detected. However, with each successive accumulation, the true peak $P_{320}$ consistently grows to amplitudes A2, A3, and A4, respectively, in this example. In this manner, after several symbols of accumulation, as shown in FIG. 3, the peak-to-noise ratio becomes sufficient to reliably indicate that the preamble is detected (e.g., the signal is detected) because the true peak continues to grow with each symbol (except for negative effects caused by the noise).

In this manner, the sensitivity gain is increased by a few dBs compared to the non-coherent detector. This may not be adequately shown by a graphic representation of a single packet because noise can vary. Therefore, in FIG. 4, as many as eight packets are plotted on top of each other to better show average peak amplitudes versus average noise levels in eight packets. FIG. 4 compares the phasor-based coherent accumulation in graph 400A with a non-coherent accumulation in graph 400B. The snapshot of the accumulations in graphs 400A and 400B was taken after exactly eight (8) accumulated symbols. The accumulators are noisy due to a low signal level.

The graph 400A shows that true correlation peaks 404A can be easily differentiated from noise 402A. The graph 400B shows that peaks 404B are closer in magnitude to noise 402B, making it more difficult to reliably discern the true peaks from the noise. Thus, employing phasor-based coherent accumulation, it would be easier, compared to non-coherent accumulation, to select a threshold that allows for the identification of true peaks while also rejecting false detections.

In this regard, in some examples, one or more criteria may be used to determine whether a true correlation peak is indicated. In some examples, satisfying the criteria may include determining that a magnitude of the phasor exceeds a threshold. In some examples, in response to determining whether the phasor satisfies the one or more criteria, the signal processor may generate an indication indicating that a signal (e.g., the preamble) is detected. In some examples, in response to determining whether the phasor satisfies the criteria (e.g., exceeds the threshold), the CFO is estimated based on a phase of the phasor. If the phasor does not satisfy the criteria, the first phasor may be discarded. In such a case, the phasor may not be used to estimate a CFO. In addition, if the first phasor does not satisfy the criteria, the accumulations of samples or phases may be discarded, reset, and/or reinitialized to restart the process of preamble detection.

Carrier recovery may be initialized using the phasor phase because there is direct dependence between the CFO and the phase of the phasor. A carrier recovery algorithm may be initialized based on the first phasor if a first phasor is determined to satisfy the criteria. Alternatively or in addition, if the first phasor is determined to satisfy the criteria, a timing recovery algorithm may be initialized based on the first phasor. Accurate carrier recovery initialization can be calculated, compensating for the symbol length and the carrier center frequency (channel used). In the case of the eight (8) detected preambles in the graphs 400A and 400B, the estimated CFOs were accurate to within +−2 ppms, which is very good considering the low signal level (close to the detection limit).

While the method of accumulating phasors improves the peak-to-noise ratio in the accumulator during the preamble detection, the final algorithm could include additional enhancements to increase the rate of good detections while reducing the rate of the false ones.

As an example, the method may include accumulating a number of symbols into a 1 st accumulator, accumulating a number of symbols into a 2nd accumulator, and then comparing the peaks of the accumulators to determine whether they are in the same position. This approach could allow for reduction of false detect rates and could allow for reduction of the detection threshold, thus improving sensitivity.

In this regard, the disclosed method may include calculating a third sample based on energy of a third symbol group and calculating a fourth symbol based on energy of a fourth symbol group. The third and fourth samples may correspond to the same sample position, within the third and fourth symbol groups, as the first sample position of the first sample and the second sample. A second conjugate of one of the third and fourth samples is calculated, and a second phasor is calculated based on complex multiplication of the second conjugate and the other one of the third and fourth samples. The method includes accumulating the first phasor and a second phasor into an accumulated phasor. The second phasor accumulated with the first phasor in an accumulated phasor is calculated from the third and fourth samples, corresponding to the sample position.

Instead of accumulation, the correlator samples may be IIR-filtered in time with the filtering factor chosen depending, for example, on the preamble's length (a longer preamble could allow for slower filtering, which may delay the detection but could improve the sensitivity).

Another alternative is monitoring the estimated (e.g., calculated) CFO. If a false preamble is detected, the estimated CFO is meaningless; therefore, the preamble should be rejected if the estimated CFO does not satisfy one or more criteria. For example, the preamble should be rejected if the estimated CFO is beyond a maximum supported range supported by the device. In this regard, the method includes determining whether the estimated CFO satisfies the one or more criteria. For example, if the signal processing device supports +−40 ppm CFO range and CFO estimation error is max +−10 ppm, any preamble detection with CFO estimate above +−41 ppm should be rejected. The method includes generating an indication indicating whether the estimated CFO satisfies the one or more criteria. Based on the indication, the estimated CFO may be rejected. In such a case, the device returns to accumulating samples with which to restart calculating/estimating the CFO. In such a case, accumulators may be flushed or reinitialized or may continue to accumulate phase information.

If it is determined that the estimated CFO satisfies the one or more criteria (e.g., does not exceed the maximum range supported by the signal processing device), a carrier recovery algorithm and/or a timing recovery algorithm may be initialized based on the estimated CFO.

Overall, compared to a non-coherent preamble detector, the new method provides 3-4 dB sensitivity improvement at low and medium CFO levels and even 5-7 dBs at 30-40 ppm (where sensitivity gain is higher mainly due to carrier recovery initialization). 3 dB sensitivity gain translates into ~40% more range.

The method disclosed herein can be used for improved preamble/sync sequence detection and receiver initialization (carrier and timing recovery convergence and tracking) in preparation to receive the remaining part of the packet, which may include data payload demodulation or a channel sounding sequence like the STS sequence defined in 802.15.4z.

Initial signal detection and carrier acquisition are the first steps of the process. After carrier acquisition, the receiver remains in lock with the transmitter. In subsequent steps, the receiver may use the SYNC/STS to develop the channel estimate. The channel estimate represents a snapshot of the physical channel state, illustrating paths and reflections occurring between the transmitter and the receiver. This is typically obtained by the receiver developing a set of correlations by correlating each code of the receiver code set with the corresponding code of the channel-distorted form of the transmitter code set; finally, developing a channel estimate by accumulating a number of channel correlations.

In an example, if the estimated CFO does not exceed a maximum supported range and the carrier and timing recovery algorithms have been initialized and started, the signal processing device in the receiver may coherently accumulate symbols into a channel estimate accumulator. A channel estimate may be generated based on the channel estimate accumulator.

The channel estimate may be used for multiple purposes, like detecting the location of the first path and/or of the following reflections, identifying objects and their location (like in radars), or for equalization purposes to demodulate the data payload.

While the channel estimate is typically developed later in the process, i.e., after the carrier lock, it can alternatively be developed using phasors. The advantage of the phasor-based channel estimates is that they can be developed faster before the CFO estimation. Phasor-based channel estimates can identify paths and their positions but cannot be used for coherent data demodulation. For coherent data demodulation, the receiver needs to know relative phase differences between the paths, and this information has been lost in the phasor calculation method.

The packet reception may also be started using the method of non-coherently accumulating one or more symbols into a non-coherent accumulator. This method is used to find candidate peak positions that may be verified by the phasor method. Non-coherently accumulating may include filtering the non-coherent symbols in the accumulator based on a symbol filter.

A sample position of the one or more symbols in a symbol group may be selected based on a sample in the non-coherent accumulator having a magnitude greater than a magnitude of any of a majority of samples in the non-coherent accumulator. In other words, the non-coherent accumulator may comprise N samples, each of which comprises a respective magnitude. The sample position may be selected based on one of the M samples in the non-coherent accumulator, where the M samples have the greatest magnitudes of the N samples and the M samples comprise less than half of the N samples. For example, where N=10 and M=3, the selected sample position may be one of the largest three (3) samples out of 10 total samples.

Additional Variants/Enhancements

Phasor-coherent accumulation may be used to process all sample positions at the correlator output, which can consume significant power and time. The processing can be split into two (2) stages (hybrid approach) to save processing power. The 1st stage can be executed non-coherently, and the 2nd stage uses the new coherent phasor. In the 1st stage, the candidate peaks would be identified and then validated using the 2nd stage. There is no need to run phasor-coherent accumulation on the whole accumulator (which saves the processing power) in this method. The 2nd stage would validate one or up to a limited number of candidate samples indicated by the 1st stage.

To further increase sensitivity, if the 2nd stage fails to confirm/validate the candidate peak as a valid preamble but the 1st stage re-submits the same candidate peak to be validated again, the 2nd stage may combine phasor accumulation metrics from both events.

To further save processing power and memory, the 1st stage non-coherent accumulator can be additionally compressed, i.e., its size can be reduced by selecting and accumulating to the accumulator only the strongest correlator sample out of N samples. For example, if N=4, the correlator output having a size of 1016 samples can be reduced to 1016/4=254 compressed samples. In this example, absolute amplitudes of correlator samples index 1 to 4 can be compared, and only the strongest 1 out of those 4 can be added to the accumulator. In this example, 254 samples may be accumulated rather than 1016.

Weak Signal Detection

Synchronization to very weak UWB frames is challenging in the conventional methods. The standard coherent receiver methods require relatively high signal energy for the accumulated peak to grow high enough (e.g., in an accumulator) to provide phase reference for the next symbols (to continue accumulation in-phase). In the absence of such a peak (because accumulation of even many symbols is not enough), the phase will continue drifting without being tracked by the carrier recovery algorithm. That will result in energy cancellation in the accumulator as the signal phase changes by more than 90-degrees. Overall, the standard methods need to lock on the signal phase quickly.

This section discusses such challenges and methods to overcome them.

Special frame types could be designed for ranging over very long distances (or with heavily attenuated signals, for example, through walls). Such frames could use either repeating sequences (Ipatov-like or similar) or special ranging sequences consisting of non-repeating symbols (predefined or generated). The sequence would preferably have a predefined length, eliminating the need for an SFD (which is typically another sensitivity bottleneck). Besides limiting the sensitivity, transmitting an SFD would be a waste of the limited energy budget.

Since the signal level reaching the receiver would be very weak, there would be no conventional preamble detection stage. Instead, the receiver would start correlation and accumulation blindly, even without detecting typical correlation peaks. The receiver would need to be triggered to start the correlation process at a precise time in expectation of the incoming signal. Since the transmitter could be beyond the range of UWB data transmission, another communications channel could be used to set up the UWB transmission. It could be another wireless PHY, which offers a longer range, or some intermediate UWB device offering coordination between UWB devices, or perhaps, pre-agreed UWB ranging sequences could be sent at pre-determined times after the initial setup.

In the case of the UWB sequence consisting of non-repeating symbols, the receiver would need to know the start time more accurately to program its correlator with the expected symbols in advance. The timing tolerance depends on the receiver processing and the processed symbol lengths. If the correlator uses a symbol length of 0.5 μs, it should be configured to start the detection process from 0.5 μs to 0.0 μs before the sequence's arrival time. Higher timing inaccuracy could result in a different correlator symbol being expected when another symbol arrives. If the received sequence consists of non-repeating bits, the receiver could process it using any length of correlator; it could even correlate the whole long sequence at once. Such long symbol processing would reduce timing requirements at the expense of hardware complexity. In the case of a UWB sequence consisting of repeating symbols, timing tolerance would be more relaxed.

One of the major challenges is a combination of a very weak signal with an unknown CFO. In such long-distance scenarios, signal energy accumulation needs to be performed for a long time. A non-coherent detector has poor sensitivity performance. The classic coherent detector requires carrier frequency offset to be tracked and compensated. It could be very difficult or impossible with extremely low signal levels. Establishing a carrier lock would take too long, and in that time, the signal phase would have changed, resulting in accumulated energy cancellation.

To detect a signal in such a difficult scenario, one possibility would be to use the phasor-based coherent accumulation, which is CFO-independent. Another option would be to measure the CFO beforehand and transfer this information to the UWB receiver for the classic receiver to accumulate the signal coherently compensating for the CFO based on the provided information. The CFO estimate and compensation would need to be accurate enough to avoid significant signal rotation error during the accumulation process, as the receiver would be unable to fine-tune the CFO estimate with a very weak signal available. For example, if the received sequence is 128 μs long on an 8 GHz UWB channel, the required CFO accuracy would be around 0.2 ppm (at 1 ppm, there is approximately 3-degrees rotation per 1 μs).

CFO measurement could be done using another physical layer, which shares the same clock signal or by using some common synchronization device shared by the transmitter and the receiver, or possibly be based on previous UWB transmissions and packets.

OPTION 1: The phasor method described earlier has a unique feature in it that it does not require carrier phase tracking to accumulate energy in a coherent way, so it could work even if the signal energy is so low that it does not allow for carrier phase locking/tracking. Indeed, the result of the correlation of the previous symbol with the current one (phasor) will always have the same phase (assuming the CFO is constant during the frame reception). Phasor's phase depends on the CFO (and the carrier frequency), but it will be constant throughout the whole accumulation process in a frame. Due to that, no carrier phase tracking is needed. Coherent phasor accumulation can start immediately from the $1^{st}$ symbol.

For example, a first phasor and a second phasor may accumulate into an accumulated phasor. This may be extended to include accumulating additional phasors into a second accumulated phasor. Thus, the method includes calculating a third phasor and a fourth phasor based on samples in respective symbol groups. The third and fourth phasor may be accumulated into the second accumulated phasor.

The accumulated phasors may be evaluated according to a criteria. The method disclosed herein may include determining that at least one of the accumulated phasors satisfies one or more criteria and generating an indication indicating whether the at least one of the accumulated phasors satisfies the one or more criteria. For example, the method may include determining that at least one of the accumulated phasors has a magnitude that exceeds a threshold. If it is determined that at least one of the accumulated phasors satisfies the criteria, an estimated CFO may be determined based on a phase of the at least one of the accumulated phasors. In addition or alternatively, an indication may be generated to indicate that a signal is detected in response to the at least one of the first accumulated phasor and the second accumulated phasor satisfying the criteria. An indication that a signal is detected may indicate detection of a SYNC for example. A phasor-based accumulator may be formed from the accumulated phasors.

With extremely weak signals, individual signal symbols may be very noisy and produce very noisy phasors. In such cases, provided that CFO is low (or compensated for using a CFO estimate signaled earlier), adding a number of consecutive symbols together is possible because the phase change between them is minimal. Low CFO can be achieved based on the CFO estimate provided earlier, for example, by adjusting the system clock rate for the adjusted UWB CFO to be within, for instance, +−1 ppm. Alternatively, the carrier recovery algorithm can compensate after being seeded with the CFO estimate.

For a remaining uncompensated CFO of 1 ppm, with 0.5 µs duration symbols on UWB channel 9 (8 GHz), the method would allow for addition/averaging of 32-64 consecutive symbols (16-32 µs). There is approximately a 48-degrees phase change per 16 µs averaging period.

The symbols added together in groups can then be used for phasor calculation (a previous group correlated with the next group). In the graph 500 in FIG. 5, with CFO=1 ppm, a phase change of 48-degrees per averaged 16 us group can be seen in the angular changes between positions A, B, C, and D relative to the origin (0,0). If the uncompensated CFO could be reduced, even more, it would enable even longer grouping of the symbols, increasing the sensitivity even more.

In some examples, a correlator takes samples of a same position of a plurality of symbols in a first symbol group and generates a first average, and takes samples at a same position of a plurality of symbols in a second symbol group to generate a second average, and a phasor is generated from the phase difference between the first average and the second average.

OPTION 2: If the CFO could be reduced or compensated for, to very low levels, for example, down to 0.2 ppm, it could allow the standard receiver method to accumulate coherently WITHOUT carrier recovery even for 128 µs. However, CFO requirements are much stricter for this method.

It is also possible to calculate accumulators coherently without the knowledge of the CFO, implementing a method using multiple de-rotators. Such method will provide multiple sub-accumulators corresponding to different hypothetical CFOs.

Combining Energy from Several Packets

If the total energy that can be used in one packet is not sufficient to detect an energy peak reliably, it is possible to transmit multiple packets and for the receiver to combine all the energy into one final, combined accumulator.

In UWB ranging, the distance estimate is based on the position of the first path. However, if there are stronger, later paths (reflections), they may be used for the CFO estimation and/or for identifying phase changes between the multiple packets and their accumulators. Subsequent accumulators can use this phase information derived from those stronger reflections to correct/align multiple accumulators' phases to combine multiple accumulators coherently. This will improve the weak first path amplitude. The situation where there are no sufficiently strong reflections to provide CFO or phase reference information is more difficult. The methods of handling multiple packets without reflections are described below.

Due to difficulties with carrier tracking in this scenario, individual UWB packets should be short (for example, 64-128 us). Due to regulatory limitations, the next packet cannot be transmitted until 1 ms after the first one to avail of the new energy budget. That means long silence periods (~900 us) between packets.

If there is a silence gap between packets, the carrier tracking (if performed at all) will be lost and will have to start at the beginning of the next packet. Therefore, the subsequent packets will need to be accumulated into separate accumulators since the starting phase will be unknown.

However, to prevent the path from moving to a different position in the accumulator because of timing drift, timing tracking and compensation will be required during or after the gap. If the timing was not tracked or compensated for, multiple accumulators could have the path located at different delays, making coherent addition of multiple accumulators impossible. Timing tracking can be easily done based on even an approximate CFO estimate, as in the case of timing tracking, the required precision is not as high as in the case of the carrier phase (timing drift is generally much slower).

It may be necessary to rerun CFO estimation (and transmit this information to the UWB receiver) between UWB packets if clocks aren't sufficiently stable and CFO varies between packets.

In the variant with multiple de-rotators, every sub-accumulator is calculated for different assumed CFO; therefore, approximate timing shifts between the multiple packet accumulators can be estimated and compensated based on the assumed CFO.

At the end of the process, multiple accumulators from different fragments, will need to be combined into one. If multiple accumulators were calculated using the phasor-based method (OPTION 1), the signal contained there will have the same phase, so combining multiple accumulators requires simple addition.

It is more problematic in the case of the standard method where samples (not phasors) are accumulated (OPTION 2). Combining multiple packets only makes sense if there was no clear first-path peak detected after the first packet. However, if there was no clear peak, then combining multiple accumulators is difficult since individual path phases in multiple accumulators are unknown.

Several methods can be used:
  A. Adding multiple accumulators after rotating them by various phases (for example, 0, 90, 180, 270 degrees) and then analyzing the final accumulator for the clear path peak above the noise level. Multiple attempts using various phases in each individual accumulator could be made, for example, ACC1 0-deg., ACC2 270-deg, ACC3 90-deg, ACC4 180-deg until the best combination is found. The best combination will have the highest peak compared to the noise level.

B. Applying a phasor-based approach to multiple accumulators. This approach is only feasible if phase advance during gaps is continuous in one direction, which only occurs if clocks are stable. In such a case, peaks in consecutive accumulators should differ by the same phase, allowing for phasor-based post-processing between the multiple accumulators. Processing algorithm could follow the steps (two variants, "a" and "b"):

step 1a: phasor vectors are calculated between consecutive accumulators at all sample positions.
step 2a: coherent addition of all phasor vectors,
OR:
step 1b: the same as step 1a.
step 2b: calculated phasor vectors are averaged at each accumulator sample positions
step 3b: averaged phasor vector phases are used to "de-rotate/phase-correct" consecutive accumulators.
step 3c: all phase-corrected accumulators are then added coherently.
C. Adding multiple accumulators non-coherently (simple but less sensitive).

The methods can be illustrated in the examples shown below. The range is 800 meters (line of sight) which produces a very weak signal.

OPTION 1 (accumulators are calculated using the phasor-based method):

In the graph 600 in FIG. 6, the four (4) packets, each lasting 128 µs, produce the channel estimates as shown. The real path can be seen as the peak 602 at a delay=380; however, it is weak in each of the four (4) packets.

Since all path peaks in the accumulator have the same phase (because they were calculated as phasors), combining them (coherently) into one estimate is no problem. In the graph 700 in FIG. 7, a total of 12 frames were simulated and then grouped together in groups of four (1-4, 5-8, 9-12). The peak 720 can be seen more reliably standing out of noise than in FIG. 6.

OPTION 2 (the default method, accumulators contain actual accumulated samples, not phasors): Assuming that the CFO estimate/compensation is perfect (no phase drift during accumulation) and the default coherent accumulation method is used, the four (4) packets each lasting 128 us produce the following channel estimates shown in the graph 800 in FIG. 8. The real path can be seen as a peak 820 at a delay=380; however, it is weak in each of the four (4) packets.

In the graph 900 in FIG. 9, a total of 12 frames were simulated and then grouped together in fours (1-4, 5-8, 9-12). The peak 920 can be seen more reliably standing out of the noise. If the four (4) accumulators were added non-coherently (method C), it would produce the COMBINED non-coherent accumulator in graph 900.

As shown in the graph 1000 in FIG. 10, if the phasor-based method, labeled B above, were used for grouping of the multiple accumulators, the results would be better in that the ratio of the amplitude of the peak 1002 to the average noise 1004 would be higher.

This document introduced a new, more robust preamble detection method, which additionally seeds carrier recovery algorithm. This is typically required for full frame processing (SYNC/SFD), including data demodulation, which requires a carrier recovery lock.

Later we proposed new frame structures and methods to execute ranging with very attenuated signals where the signal is too weak to track the carrier phase. As the total packet energy was used for ranging pulses, the range was generally improved compared to the default UWB frames (which combined SYNC with SFD and STS). The new frame structures could feature only one ranging sequence (which could be similar to repetitive Ipatov-like SYNC or non-repetitive ones, similar to the secure STS described in 802.15.4z).

The new frame structures could also be used in a receiver performing data demodulation. If the frame start is set up by another trigger, there is no need to "detect" the preamble since the receiver would know that the preamble is coming at a particular time. It's only a matter of finding an accurate location (delay) of the energy peaks that can be used for carrier phase tracking. This way, portions of the frame could be eliminated, saving time and energy budget. For example, the frame could start with an STS-like sequence of pre-defined length followed by a data payload (if needed). There would be no standard SYNC or SFD. An STS-like sequence would be used to acquire the carrier phase and create a channel estimate for optimal data demodulation.

Those skilled in the art will recognize improvements and modifications to the preferred embodiments of the present disclosure. All such improvements and modifications are considered within the scope of the concepts disclosed herein and the claims that follow.

FIG. 11 is a diagram of an example of a communication system 1100 comprising a transceiver 1102 coupled to an antenna system 1104 for receiving and processing a signal, such as the UWB signals, according to the exemplary aspects discussed above. The transceiver circuit 1102 includes a control circuit 1106, which further comprises an instruction processing circuit (processing circuit) 1108 coupled to a cache memory 1110. The method of detecting a signal in the presence of an unknown CFO, as discussed above, may be performed by circuitry within the control circuit 1106 including the instruction processing circuit 1108. In this regard, the control circuit 1106 may be a signal processor or signal processing circuit as disclosed above and configured to perform the methods disclosed above. The communication system 1100 further includes a system memory 1112 including a memory control circuit 1114. The system memory 1114 may be coupled to the control circuit 1106 via a system bus 1116. In an alternative example, the control circuit 1106 may include a memory separate from the cache 1110. The communication system 1110 further includes input/output interfaces 1118 coupled to the system bus 1116. The input/output interfaces 1118 may be user interfaces, such as a keyboard, microphone, speaker, or video touch screen of any type. The input/output interfaces 1118 may be other telecommunications interfaces, such Bluetooth, WiFi, etc.

What is claimed is:

1. A signal processing method, comprising:
calculating a first sample based on energy of a first symbol group comprising at least one symbol;
calculating a second sample based on energy of a second symbol group comprising at least one symbol;
calculating a first conjugate of one of the first sample and the second sample; and
calculating a first phasor based on a complex multiplication of the first conjugate and the other one of the first sample and the second sample;
wherein:
the first sample corresponds to a first sample position of each symbol of the first symbol group; and
the second sample corresponds to the first sample position of each symbol of the second symbol group;

determining whether the first phasor satisfies one or more criteria; and generating an indication indicating whether the first phasor satisfies the one or more criteria.

2. The signal processing method of claim 1, wherein determining the first phasor satisfies the one or more criteria comprises determining that a magnitude of the first phasor exceeds a threshold.

3. The signal processing method of claim 2, further comprising, in response to the indication indicating the first phasor satisfies the one or more criteria, indicating that a signal is detected.

4. The signal processing method of claim 3, further comprising, in response to the indication indicating the first phasor satisfies the one or more criteria estimating a carrier frequency offset (CFO) based on a phase of the first phasor.

5. The signal processing method of claim 1, further comprising, in response to the indication indicating the first phasor does not satisfy the one or more criteria, discarding the first phasor.

6. The signal processing method of claim 1, further comprising, in response to the indication indicating the first phasor satisfies the one or more criteria, initializing a carrier recovery algorithm based on the first phasor.

7. The signal processing method of claim 1, further comprising, in response to the indication indicating the first phasor satisfies the one or more criteria, initializing a timing recovery algorithm based on the first phasor.

8. The signal processing method of claim 7, further comprising, in response to the indication that the first phasor does not satisfy the one or more criteria, coherently accumulating symbols into a channel estimate accumulator.

9. A signal processing method, comprising:
calculating a first sample based on energy of a first symbol group comprising at least one symbol;
calculating a second sample based on energy of a second symbol group comprising at least one symbol;
calculating a first conjugate of one of the first sample and the second sample; and
calculating a first phasor based on a complex multiplication of the first conjugate and the other one of the first sample and the second sample;
wherein:
the first sample corresponds to a first sample position of each symbol of the first symbol group; and
the second sample corresponds to the first sample position of each symbol of the second symbol group;
calculating a third sample based on energy of a third symbol group comprising at least one symbol;
calculating a fourth sample based on energy of a fourth symbol group comprising at least one symbol;
calculating a second conjugate of one of the third sample and the fourth sample;
calculating a second phasor based on a complex multiplication of the second conjugate and the other one of the third sample and the fourth sample; and
accumulating the first phasor and the second phasor into a first accumulated phasor, wherein:
the third sample corresponds to the first sample position of each symbol of the third symbol group; and
the fourth sample corresponds to the first sample position of each symbol of the fourth symbol group.

10. The signal processing method of claim 9, wherein accumulating the first phasor and the second phasor into a first accumulated phasor further comprises filtering the first phasor and the second phasor in the accumulator.

11. The signal processing method of claim 9, further comprising:
calculating a third phasor based on a fifth sample and a sixth sample, the fifth sample corresponding to a second sample position of each symbol in a fifth symbol group and the sixth sample corresponding to the second sample position of each symbol in a sixth symbol group, each of the fifth symbol group and the sixth symbol group comprising at least one symbol;
calculating a fourth phasor based on a seventh sample and an eighth sample, the seventh sample corresponding to the second sample position of each symbol in a seventh symbol group and the eighth sample corresponding to the second sample position of each symbol in an eighth symbol group, each of the seventh symbol group and the eighth symbol group comprising at least one symbol;
accumulating the third phasor and the fourth phasor into a second accumulated phasor; and
forming a phasor-based accumulator comprising the first accumulated phasor and the second accumulated phasor.

12. The signal processing method of claim 9, further comprising:
determining the first accumulated phasor satisfies one or more criteria; and
generating an indication indicating that the first accumulated phasor satisfies the one or more criteria.

13. The signal processing method of claims 11, further comprising:
determining that at least one of the first accumulated phasor and the second accumulated phasor satisfies one or more criteria; and
generating an indication indicating whether at least one of the first accumulated phasor and the second accumulated phasor satisfies the one or more criteria.

14. The signal processing method of claim 13, wherein determining at least one of the first accumulated phasor and the second accumulated phasor satisfies the criteria comprises determining that a magnitude of at least one of the first accumulated phasor and the second accumulated phasor exceeds a threshold.

15. The signal processing method of claim 13, further comprising, in response to the indication indicating the at least one of the first accumulated phasor and the second accumulated phasor satisfies one or more criteria, indicating that a signal is detected.

16. The signal processing method of claim 13, further comprising, in response to the indication indicating the at least one of the first accumulated phasor and the second accumulated phasor satisfies one or more criteria, generating an estimated carrier frequency offset (CFO) based on a phase of the at least one of the first accumulated phasor and the second accumulated phasor determined to satisfy the one or more criteria.

17. The signal processing method of claim 16, further comprising:
determining whether the estimated CFO exceeds a supported range; and
generating an indication indicating whether the estimated CFO satisfies the one or more criteria.

18. The signal processing method of claim 17, further comprising, in response to the indication that the estimated CFO does not exceed the supported range, initializing a carrier recovery algorithm based on the estimated CFO.

19. The signal processing method of claim 17, further comprising, in response to the indication that the estimated CFO does not exceed the supported range, initializing a timing recovery algorithm based on the estimated CFO.

20. The signal processing method of claim 17, further comprising, in response to the indication that the estimated CFO does not exceed the supported range, coherently accumulating symbols into a channel estimate accumulator.

21. The signal processing method of claim 17, further comprising, in response to the indication that the estimated CFO exceeds the supported range, discarding the estimated CFO.

22. The signal processing method of claim 1, further comprising non-coherently accumulating one or more symbols into a non-coherent accumulator.

23. The signal processing method of claim 22, wherein the first sample position is selected based on a sample in the non-coherent accumulator having a magnitude greater than a magnitude of any of a majority of samples in the non-coherent accumulator.

24. The signal processing method of claim 22, wherein non-coherently accumulating one or more symbols into the non-coherent accumulator further comprises filtering non-coherent symbols based on a symbol filter.

* * * * *